US005547248A

United States Patent [19]

Marechal

[11] Patent Number: 5,547,248
[45] Date of Patent: Aug. 20, 1996

[54] PASSENGER SEAT FOR A PUBLIC TRANSPORT VEHICLE, THE SEAT INCLUDING A VIDEO DISPLAY WHICH CAN BE RETRACTED INTO AN ARMREST

[75] Inventor: Robert R. Marechal, Paris, France

[73] Assignee: Societe Industrielle et Commerciale De Materiel Aeronautique, Issoudun, France

[21] Appl. No.: 237,397

[22] Filed: May 3, 1994

[30] Foreign Application Priority Data

May 26, 1993 [FR] France ................................ 93 06315

[51] Int. Cl.[6] ................................................ A47C 7/72
[52] U.S. Cl. ............................ 297/188.17; 297/188.16; 297/145; 248/278.1
[58] Field of Search ............................ 297/145, 188.16, 297/188.17, 188.19; 248/278, 279, 920

[56] References Cited

U.S. PATENT DOCUMENTS

| 4,417,764 | 11/1983 | Marcus et al. | 297/188.17 |
| 4,592,526 | 6/1986 | Kobelt | 248/278 |
| 5,076,524 | 12/1991 | Reh et al. | 297/188.17 |
| 5,177,616 | 1/1993 | Riday | 297/217.3 X |
| 5,179,447 | 1/1993 | Lain | 297/188.16 X |
| 5,337,676 | 8/1994 | Ahad | 297/188.17 X |
| 5,374,104 | 12/1994 | Moore et al. | 297/188.16 |

FOREIGN PATENT DOCUMENTS

| 0441149 | 2/1991 | European Pat. Off. . |
| 0423349 | 4/1991 | European Pat. Off. . |
| 2-249734 | 10/1990 | Japan . |
| 3-214980 | 9/1991 | Japan . |

Primary Examiner—Peter R. Brown
Attorney, Agent, or Firm—Young & Thompson

[57] ABSTRACT

The invention relates to a passenger seat for a public transport vehicle, in particular an aircraft, the seat including at least one armrest 1 and at least one individual video display 2 associated with the armrest 1, said seat being characterized in that the video display 2 is retractably mounted via a slot 3 provided in a top wall 4 of the front portion 5 of the armrest 1.

6 Claims, 2 Drawing Sheets

5,547,248

PASSENGER SEAT FOR A PUBLIC TRANSPORT VEHICLE, THE SEAT INCLUDING A VIDEO DISPLAY WHICH CAN BE RETRACTED INTO AN ARMREST

FIELD OF THE INVENTION

The invention relates to a passenger seat for a public transport vehicle, in particular an aircraft, the seat being provided with at least one armrest and at least one individual video display associated with the armrest so as to enable each passenger to watch entertainment or information programs chosen individually by the passenger on a video display provided specifically for that passenger.

BACKGROUND OF THE INVENTION

First class or business class air liner seats are sometimes provided with individual video displays associated with the armrests via a hinged arm.

However, in such known seats, enough space must be available in front of the armrest for the retracting and deploying operations to be performed. Therefore, they are generally considered to be too bulky, non-ergonomic, and inconvenient to use. In addition, it must be possible to place the video display in front of the seated passenger, without it constituting an obstacle that could injure the passenger in the event of an impact or of sudden braking.

SUMMARY OF THE INVENTION

An object of the invention is to mitigate those drawbacks, and to provide a passenger seat that includes a video display which requires no empty space in front of the armrest.

Another object of the invention is to provide such a seat equipped with a retractable screen that can be deployed and retracted more easily, more ergonomically, and in particular without the passenger having to change position. In this way, an object of the invention is to provide such a video display which can be retracted or deployed even while the passenger remains seated, e.g. even while the passenger is having a meal or a drink with a cocktail table being in position in front of the passenger.

Another object of the invention is to provide such a seat in which deploying the video display does not require any particular effort by the passenger.

At the same time, an object of the invention is to provide such a video display in which the video display does not constitute a dangerous obstacle for the passenger when it is in the deployed position.

Another object of the invention is to provide such a seat in which the hinge mechanism of the video display is simple, cheap, and lightweight.

To these ends, the invention provides such a seat characterized in that the video display 2 is retractably mounted via a slot provided in a top wall of the front portion of the armrest. The video display is mounted via a hinged arm that is hinged to a base plate guided in vertical translation inside the front portion of the armrest. The hinged arm is hinged to the base plate about a vertical axis, and the video display can be moved out of the way in the event of an impact, without constituting an obstacle for the passenger.

The invention also provides a seat which includes a combination of all or some of the characteristics mentioned above or below.

BRIEF DESCRIPTION OF THE DRAWINGS

Other characteristics and advantages of the invention will appear on reading the following description with reference to the accompanying drawings, in which.

DETAILED DESCRIPTION OF THE INVENTION

Figure 2:
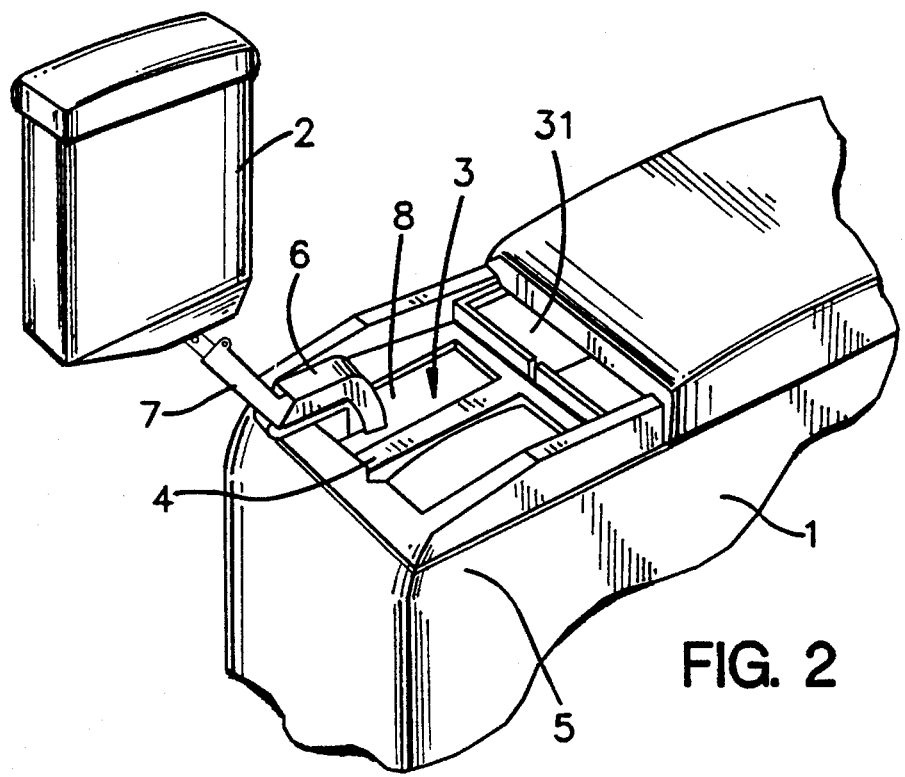
FIGS. 2 and 3 are perspective views showing various positions of the video display when it is deployed from a seat of the invention.
Figure 3:
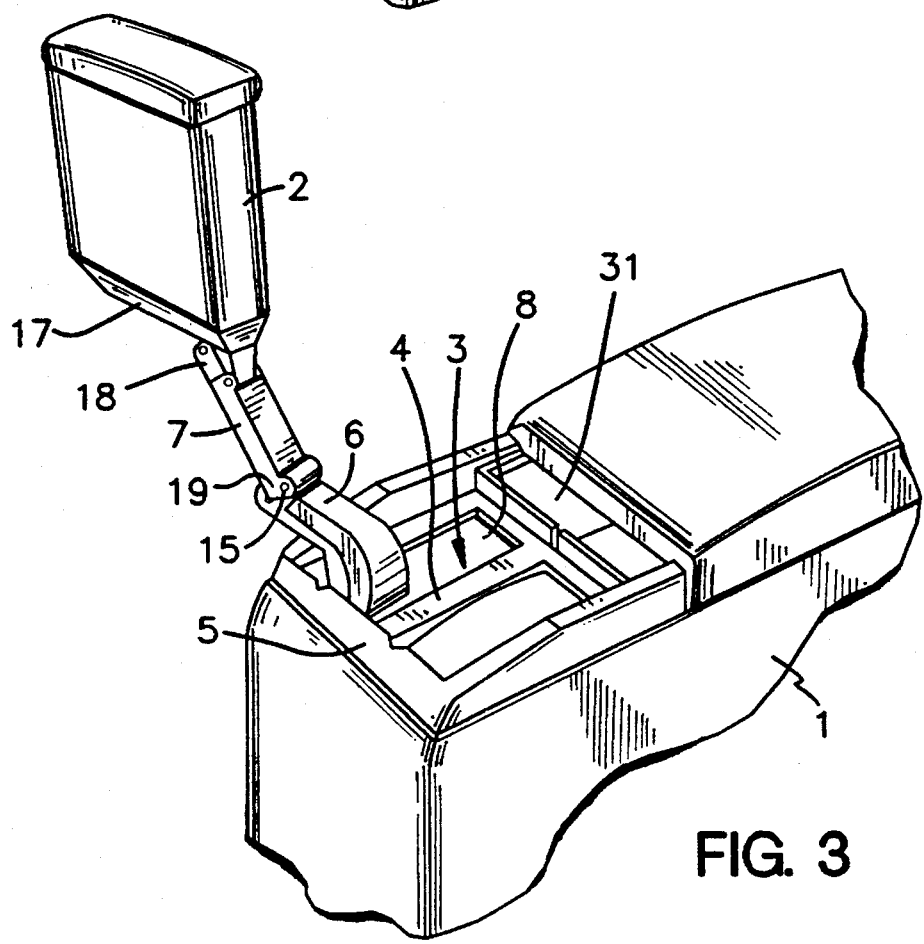

The figures are fragmentary views showing an armrest 1 of a passenger seat for a public transport vehicle, in particular an aircraft. An individual video display 2 associated with the armrest 1 is provided for each seat. The armrest 1 shown in FIGS. 2 and 3 is a central armrest which may include two video displays side-by-side for respective ones of the passengers sitting in the seats separated by the armrest.

The video display 2 is retractably mounted in the armrest 1 via a slot 3 provided in a top wall 4 of the front portion 5 of the armrest 1. The video display 2 is mounted via a hinged arm 6, 7 that is hinged to a horizontal base plate 8 guided in vertical translation inside the front portion 5 of the armrest 1. The base plate 8 is guided in the armrest 1 by means of two vertical guide columns 9, 10 extending in front of and behind the plate 8 which is slidably mounted between the columns 9, 10 via bearings 11, 12 that are secured to the base plate 8.

The hinged arm 6, 7 is provided with a crank 6 hinged to the base plate 8 about a vertical axis 13, and a connecting rod 7 hinged to the end 14 of the crank 6 about a horizontal axis 15. That end 14 of the crank 6 which is hinged to the connecting rod 7 is one end 14 of a horizontal portion 16 of the crank 6. The video display 2 is hinged via its bottom portion 17 to that end 18 of the connecting rod which is opposite from the end 19 of the connecting rod that is hinged to the crank 6.

The hinge between the connecting rod 7 and the crank 6 includes an abutment 20 limiting the deployment of the connecting rod 7 relative to the crank 6 about the normal horizontal pivot axis 15. In addition, a second hinge axis 21 parallel to the normal pivot axis 15 connects the abutment 20 to the end 14 of the crank 6. The second hinge axis 21 includes axial clamping means, e.g. in the form of a bolt and of clamping washers which permit the connecting rod 7 to pivot relative to the crank 6 beyond the deployed position of the connecting rod against the abutment 20 only when the pivot torque exceeds a predetermined value. In this way, in the event of impact, the video display is folded down forwards into the position indicated in the left-hand portion of FIG. 1.

Moreover, the video play 2 is hinged to the end 18 of the connecting rod 7 about a horizontal axis 22 which is orthogonal to the hinge axis 15 about which the connecting rod 7 is hinged to the crank 6. In this way, the video display 2 may be inclined so as to direct it towards the passenger.

The base plate 8 is returned by resilient return means 23 into its top position in which the video display 2 is deployed outside of the armrest 1. The return means 23 may, as shown, be constituted by a pneumatic actuator whose cylinder is closed and full of air in the deployed position. The return means 23 are associated at one end with the fixed structure of the seat, and at the other end with a system of connecting rods 26 having one end 27 hinged to the base plate 8 and its other end 28 hinged to the fixed structure.

The seat further includes a locking device 24, 25 for locking the base plate 8 in the bottom position in which the video display 2 is retracted inside the armrest 1. The locking device 24, 25 is a device that is both locked and unlocked by downward vertical pressure being exerted on the video display 2, and therefore on the base plate 8. The locking device 24, 25 is constituted by an elastically-bendable tab 24 anchored via one of its ends that is secured to the armrest 1, and having a hook-shaped free other end 29 that co-operates with an abutment surface 25 secured to the base plate 8. In a variant (not shown), the tab 24 may be secured to the base plate 8, and the abutment surface 25 may be secured to the armrest 1. The locking device 24, 25 is represented in more detail in FIG. 4. The abutment surface 25 is constituted by a central abutment surface of a groove having the overall shape of a heart that is inclined relative to the vertical, and that is provided in a block 30 secured to the base plate 8. At rest, the tab 24 extends at least substantially vertically. Dashed lines represent the various positions of the free end 29 of the tab 24 when it is engaged in the groove in the block 30 during locking, during a period in which it is maintained in the locked position, and during unlocking.

Figure 5:
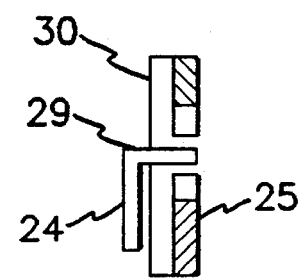
FIG. 5 is a section on the line V—V of FIG. 4.

As is seen in FIG. 5, the end 29 of tab 24 is hook shaped. The abutment surface 25 presents substantially the shape of a heart comprising a groove around the central incurred portion forming an abutment. The abutment surface is inclined relative to the vertical.

Figure 4:
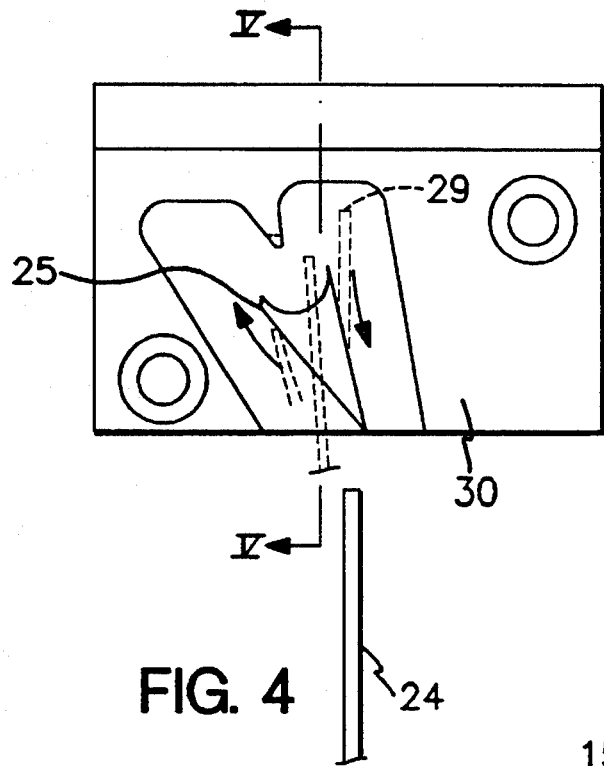
FIG. 4 is an enlarged detail view seen along arrow F of FIG. 1, showing a locking device for locking the armrest base plate of a seat of the invention.

As will be seen in FIG. 4, to lock the base plate 8, the free hook-shaped end 29 of the tab 24 engages in the groove of the left wing of the heart. Then, due to the shape and to the resilience of 24, the free end 29 automatically reaches the incurred portion. In this position, the base plate is locked.

To unlock the base plate, a downward pressure is exerted on the video display, enabling the free end 29 to leave the incurred portion in the direction of the top of the right wing of the heart as seen in FIG. 4. Thus, the free end can exit the right groove as shown, and the base plate is unlocked.

The crank 6 is hinged about the vertical axis 13 relative to the base plate 8 by hinge means which lock the base plate 8 in the top position relative to the top wall 4 as soon as the crank 6 has pivoted about the vertical axis 13 from its backwardly facing position which it takes up when the video display 2 is retracted inside the armrest 1. Such locking may be performed by a set of suitably-shaped rings and by a catch mounted under the wall 4.

Figure 1:
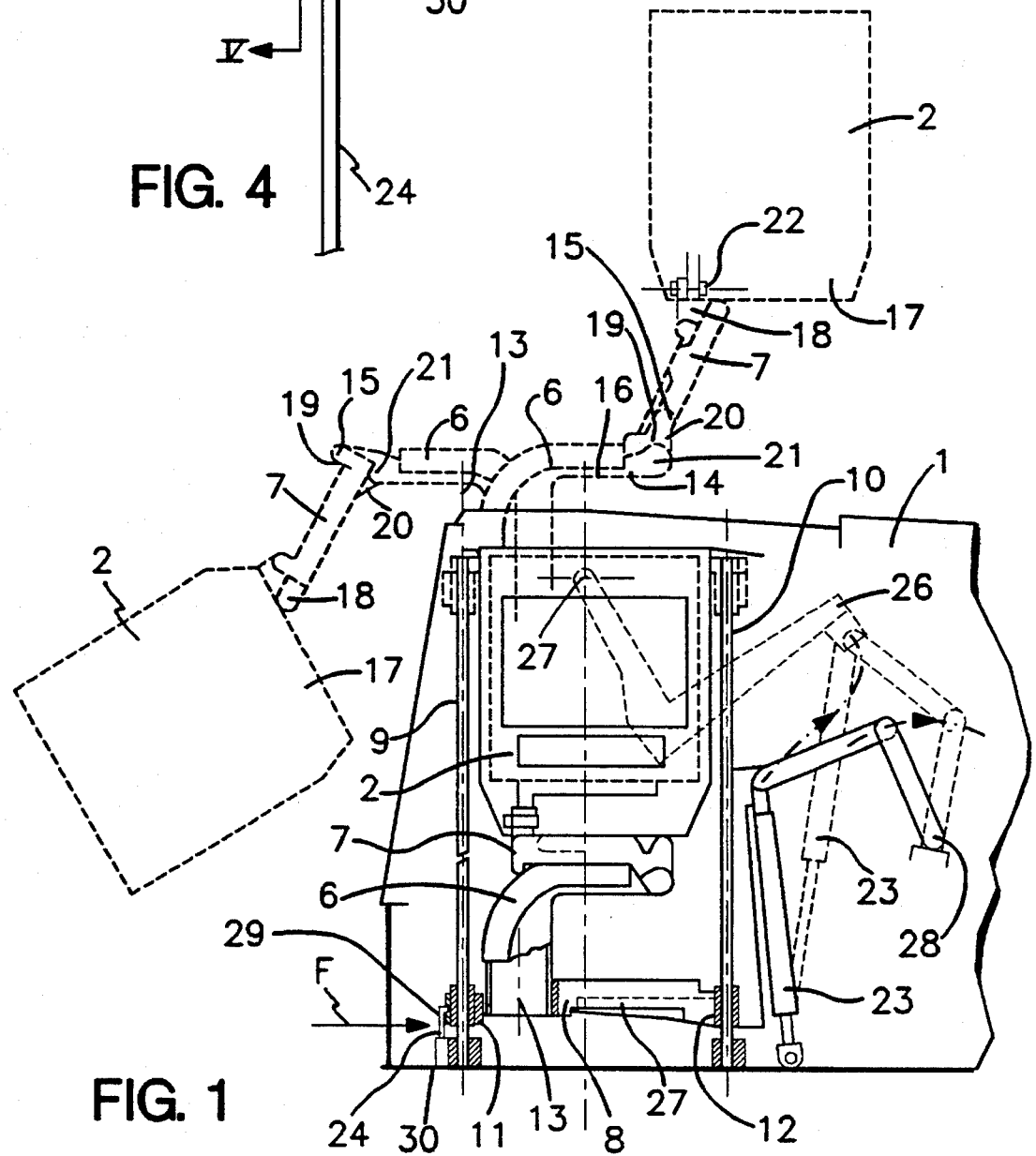
FIG. 1 is a vertical section view through an armrest of a seat according to the invention, showing the video display in various retracted and deployed positions.

The video display 2 is mounted relative to the armrest 1 so as to be flush with the top wall 4 of the armrest 1 when the video display is in the retracted position inside the armrest 1 as shown in FIG. 1. The top portion of the video display 2 may include a cushion as shown in FIGS. 2 and 3 so as to extend a cushion covering the rear portion of the armrest 1. The armrest 1 also includes sliding panels 31 that can be retracted under the cushion of the armrest 1, and that cover the slot 3 when the screen is in the deployed position.

If the screen 2 does not have a cushion on its top, the panel 31 may cover the video display 2 when the video display is retracted.

To deploy the video display 2 from its retracted position shown in FIG. 1, the passenger merely has to press vertically downwards on the video display 2 as if it were a push button. When the passenger releases the pressure, the video display 2 rises up until the base plate 8 comes flush with the top wall 4. The passenger then deploys the connecting rod 7 relative to the crank 6 against which the connecting rod was previously folded, until the video display is in the position shown in the top portion of FIG. 1. The passenger then pivots the crank 6 about the vertical axis 13 until the desired position is reached (FIG. 3) in which the passenger can watch the screen 2. From this position, if the user wishes to leave the seat, said user merely has to push the screen forwards, the crank 6 then pivoting forwards about the axis 13 until it reaches the position shown in FIG. 2. From the position shown in FIG. 3, if the passenger is suddenly subjected to a large amount of deceleration, firstly the screen 2 is pushed forwards into the position shown in FIG. 2 by being pivoted about the axis 13, and then the connecting rod 7 pivots about the axis 21 as shown in the left-hand portion of FIG. 1. To retract the video display 2 inside the armrest 1, the operations are performed in reverse order.

I claim:

1. In a passenger seat for a public transport vehicle, the seat including at least one armrest (1) having a front portion (5) with a top wall (4) and at least one individual video display (2) associated with the armrest (1), the video display (2) being mounted via a hinged arm (6, 7) that is hinged to a base plate (8) guided inside a front portion (5) of the armrest (1) by two vertical guide columns (9, 10) extending in front of and behind the base plate (8); the improvement wherein the hinged arm (6, 7) includes a crank (6) having an end (14) and hinged to the base plate (8) about a vertical axis (13), and a connecting rod means (7) having two ends, one of which is hinged to the end (14) of the crank (6) about a horizontal axis, the other end of which is hinged to the video display (2) via its bottom portion (17), the video display (2) being retractably mounted via a slot (3) provided in a top wall (4) of the front portion (5) of the armrest (1).

2. A seat according to claim 1, wherein the video display (2) is hinged to the end of the connecting rod means (7) about a horizontal axis (22) which is orthogonal to the hinge axis about which the connecting rod means (7) is hinged to the crank (6).

3. A seat according to claim 1, wherein the base plate (8) is returned by resilient return means (23) to the top position in which the video display (2) is deployed outside of the armrest (1), and in that the seat includes in a block (30) secured to the base plate (8) a locking device (24, 25) for locking said base plate (8) in the bottom position in which the video display (2) is retracted inside the armrest (1).

4. A seat according to claim 3, wherein the locking device (24, 25) is a device which is both locked and unlocked by downward vertical pressure being exerted on the video display (2).

5. A seat according to claim 3, wherein the locking device (24, 25) is constituted by a resilient tab (24) that is secured to the armrest (1) or to the base plate (8), which tab has a hook-shaped free end (29) that cooperates with an abutment surface (25) secured to the base plate (8) or to the armrest (1).

6. A seat according to claim 1, wherein the video display (2) is mounted relative to the armrest (1) so as to come flush with the top wall (4) of the armrest (1) when the video display is in a retracted position inside the armrest.

* * * * *